United States Patent
Koehler et al.

(10) Patent No.: US 11,364,859 B2
(45) Date of Patent: Jun. 21, 2022

(54) VEHICLE DOOR ASSEMBLY

(71) Applicant: Ford Global Technologies, LLC, Dearborn, MI (US)

(72) Inventors: Juergen Koehler, Cologne (DE); Xuqiang Shen, Nanjing (CN); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 16/722,484

(22) Filed: Dec. 20, 2019

(65) Prior Publication Data

US 2021/0188194 A1    Jun. 24, 2021

(51) Int. Cl.
  *B60R 13/02*    (2006.01)
  *B60J 5/04*    (2006.01)
  *B60R 11/00*    (2006.01)

(52) U.S. Cl.
  CPC ......... *B60R 13/0243* (2013.01); *B60J 5/0468* (2013.01); *B60R 2011/0014* (2013.01); *B60R 2011/0021* (2013.01)

(58) Field of Classification Search
  CPC ......... B60R 13/0243; B60R 2011/0021; B60R 13/02; B60N 2/78; B60J 5/0468; B60J 5/0469
  USPC ............................................. 296/146.7, 153
  See application file for complete search history.

(56) References Cited

U.S. PATENT DOCUMENTS

| | | | |
|---|---|---|---|
| 6,213,538 B1* | 4/2001 | Scheidmantel | B60N 2/78 296/153 |
| 7,731,269 B2* | 6/2010 | Sakamoto | B60N 2/797 296/153 |
| 2018/0290571 A1* | 10/2018 | Memetla Martinez | B60N 2/75 |
| 2020/0223339 A1* | 7/2020 | Sia, Jr. | B60N 2/78 |
| 2020/0406749 A1* | 12/2020 | Rozier | B60Q 3/217 |

FOREIGN PATENT DOCUMENTS

| | | | | |
|---|---|---|---|---|
| CN | 112937266 A | * | 6/2021 | |
| EP | 1978535 A2 | * | 10/2008 | ............ H01H 13/70 |
| JP | 2008284958 A | * | 11/2008 | |
| JP | 2014121980 A | | 7/2014 | |
| JP | 2016124381 A | | 7/2016 | |
| JP | 2019031184 A | | 2/2019 | |
| KR | 970015116 A | * | 4/1997 | |
| KR | 0132970 Y1 | | 3/1999 | |

OTHER PUBLICATIONS

Machine translation of JP 2008284958.*
Machine translation of JP 2016124381.*

* cited by examiner

*Primary Examiner* — D Glenn Dayoan
*Assistant Examiner* — Kevin P Weldon
(74) *Attorney, Agent, or Firm* — Vichit Chea; Price Heneveld LLP

(57) ABSTRACT

A vehicle door assembly including a door panel. A support member is coupled to the door panel. The support member has an edge defining an opening in a top portion thereof. The support member defines at least one flange extending into the opening from the edge. A switch bezel is disposed at least partially within the opening. The switch bezel includes at least one retaining feature configured to slidably engage the at least one flange. A cover member coupled to a side portion of the support member.

16 Claims, 10 Drawing Sheets

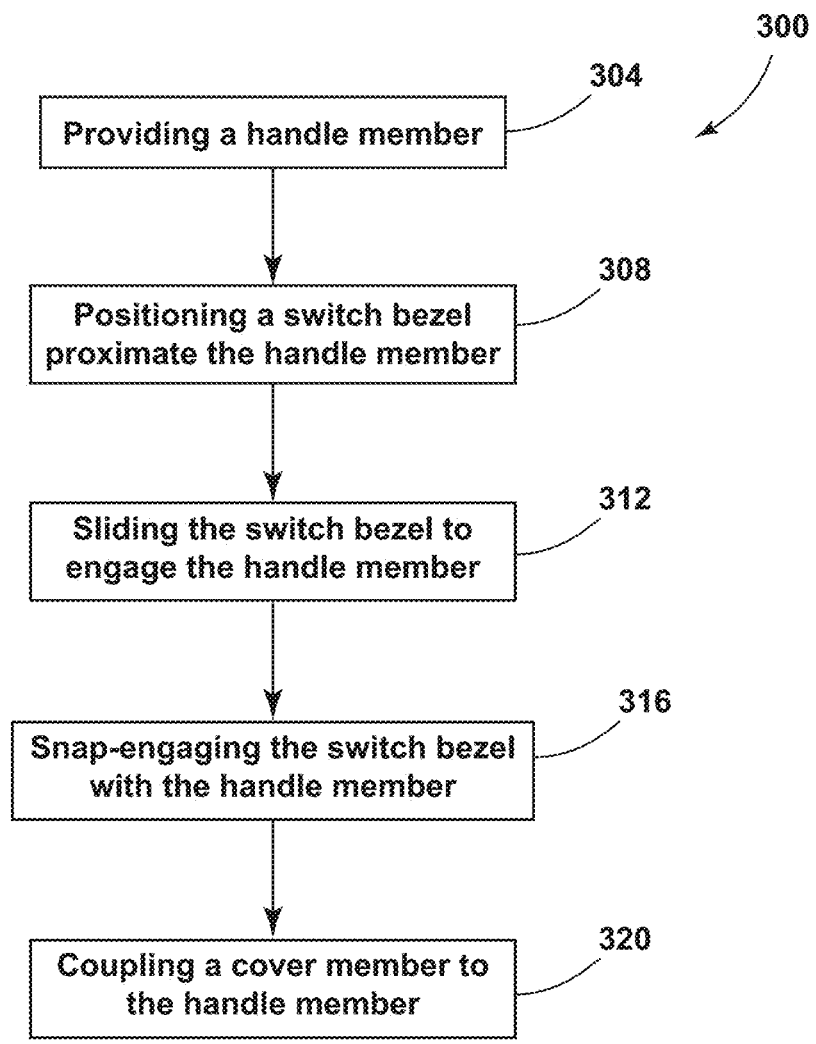

VEHICLE DOOR ASSEMBLY

FIELD OF THE DISCLOSURE

The present disclosure generally relates to a door assembly. More specifically, the present disclosure relates to a door assembly for a vehicle.

BACKGROUND OF THE DISCLOSURE

Vehicle doors typically include a switch assembly. The switch assembly can include a switch bezel with a switch for controlling a vehicle window.

SUMMARY OF THE DISCLOSURE

According to at least one aspect of the present disclosure, a vehicle door assembly including a door panel. A support member is coupled to the door panel. The support member has an edge defining an opening in a top portion thereof. The support member defines at least one flange extending into the opening from the edge. A switch bezel is disposed at least partially within the opening. The switch bezel includes at least one retaining feature configured to slidably engage the at least one flange. A cover member coupled to a side portion of the support member.

According to another aspect of the present disclosure, a method of manufacturing a switch bezel assembly including a support member that provides having at least one flange extending into an opening defined in a top portion thereof. A switch bezel having at least one retaining feature positioned proximate the opening. The at least one retaining feature sliding under the at least one flange. The switch bezel snap-engaging with an edge of the support member.

According to another aspect of the present disclosure, a switch bezel assembly including a support member having an edge that defines an opening in a top portion thereof. The support member defines at least one flange extending into the opening. A switch bezel having at least one retaining feature that slidably engages the at least one flange. The switch bezel includes a rib configured to engage the edge of the support member.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 11 is a flow diagram of a method of manufacturing a switch bezel assembly, according to one example.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
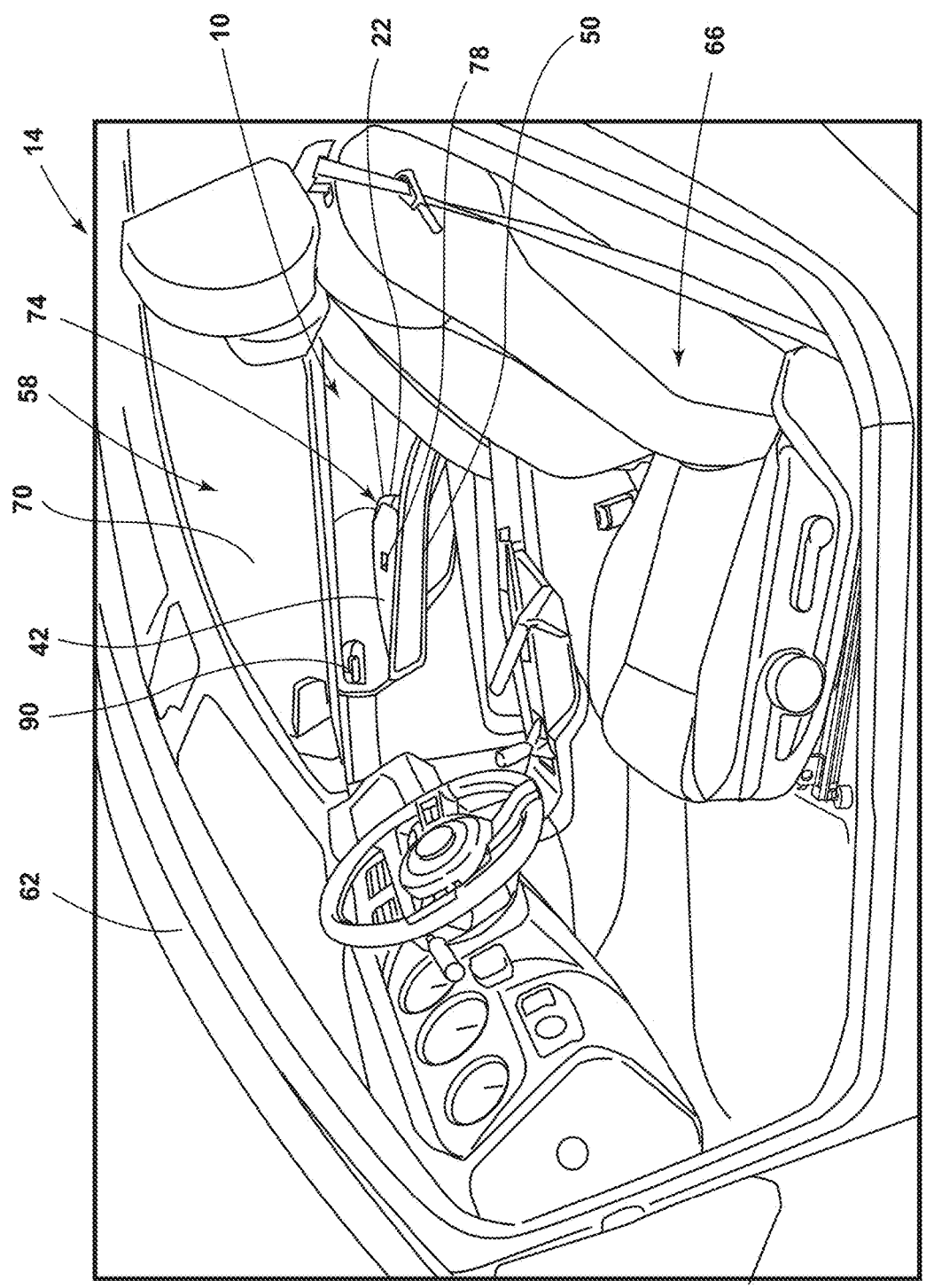
FIG. 1 is a side perspective view of a passenger cabin of a vehicle, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-11, reference numeral 10 generally refers to a door assembly for a vehicle 14 that includes a door panel 18. A support member 22 is coupled to the door panel 18. The support member 22 has an edge 26 defining an opening 30 in a top portion 34 thereof. The support member 22 defines at least one flange 38 that extends into the opening 30 from the edge 26. A switch bezel 42 is disposed at least partially within the opening 30. The switch bezel 42 includes at least one retaining feature 46 configured to slidably engage the at least one flange 38. A cover member 50 is coupled to a side portion 54 of the support member 22.

Referring to FIG. 1, the vehicle 14 typically includes a passenger cabin 58 defined by a body 62 and has one or more seating assemblies 66 disposed in the vehicle 14. The vehicle 14 may be a sedan, a sport utility vehicle, a van, a truck, a crossover, or another style of vehicle 14. In various examples, the vehicle 14 may be a manually operated vehicle 14 (e.g., with a human driver), a fully autonomous vehicle 14 (e.g., with no human driver), or a partially autonomous vehicle 14 (e.g., operated with or without a human driver). Additionally, the vehicle 14 may be utilized for personal and/or commercial purposes, such as for ride-providing services (e.g., chauffeuring) and/or ride sharing services.

Figure 6:
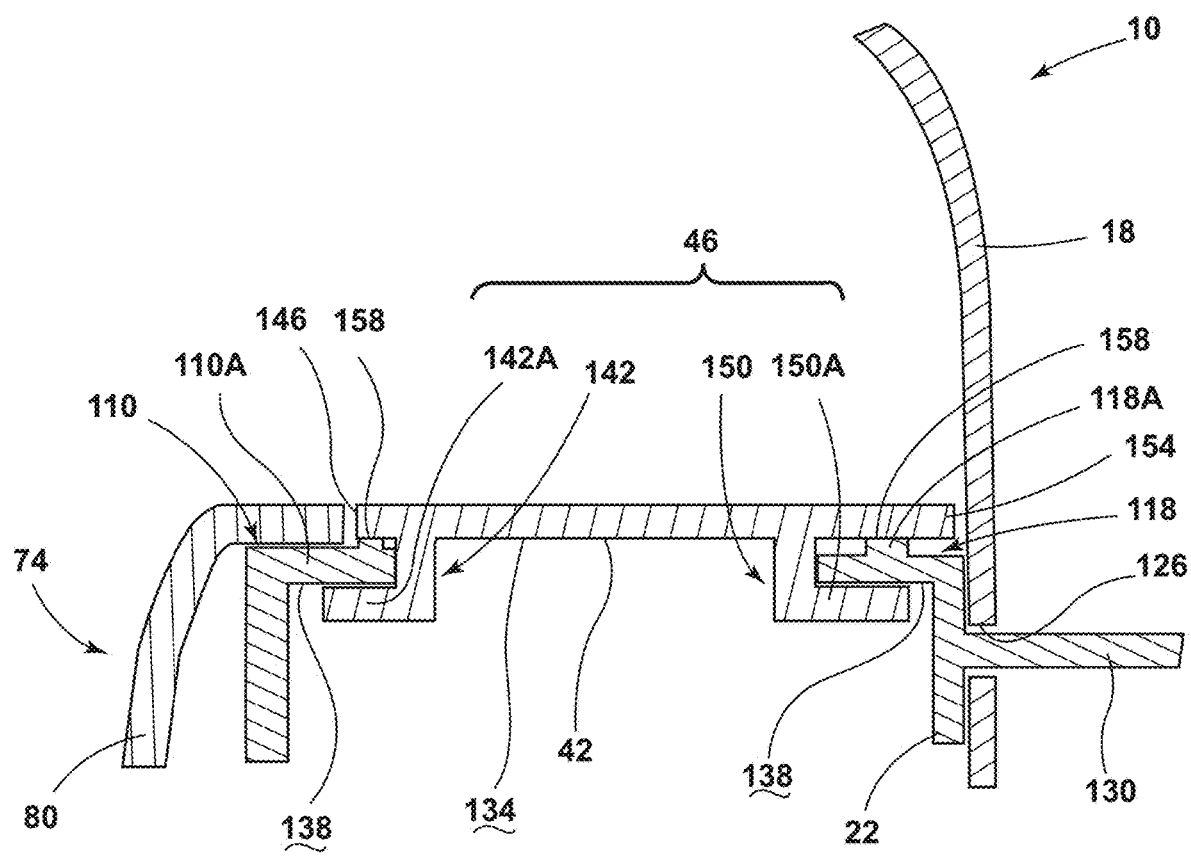
FIG. 6 is a cross-sectional view of the switch bezel assembly of FIG. 4, taken along line VI-VI.

Referring to FIGS. 1-3B, the vehicle 14 includes at least one door assembly 10 coupled to the body 62. The door assembly 10 may include the door panel 18, a window 70 coupled with the door panel 18, and a switch bezel assembly 74 coupled to the door panel 18. The switch bezel assembly 74 may include a switch 78 for controlling the window 70 of the door assembly 10. It is contemplated that the switch bezel assembly 74 may include more than one switch 78 to control multiple windows 70 of the vehicle 14. As best illustrated in FIG. 6, one first flange 110A may engage one first retaining feature 142A. Similarly, one second flange 118A may engage one second retaining feature 150A. Each of the first plurality of first and second flanges 110, 118 may engage the corresponding plurality of first and second retaining features 142, 150 in a similar manner. The engagement between the pluralities of first and second flanges 110, 118 with the corresponding pluralities of first and second retaining features 142, 150 operates to minimize movement of the switch bezel 42 in the y-direction and the z-direction (e.g., inboard-and-outboard).

Figure 2:
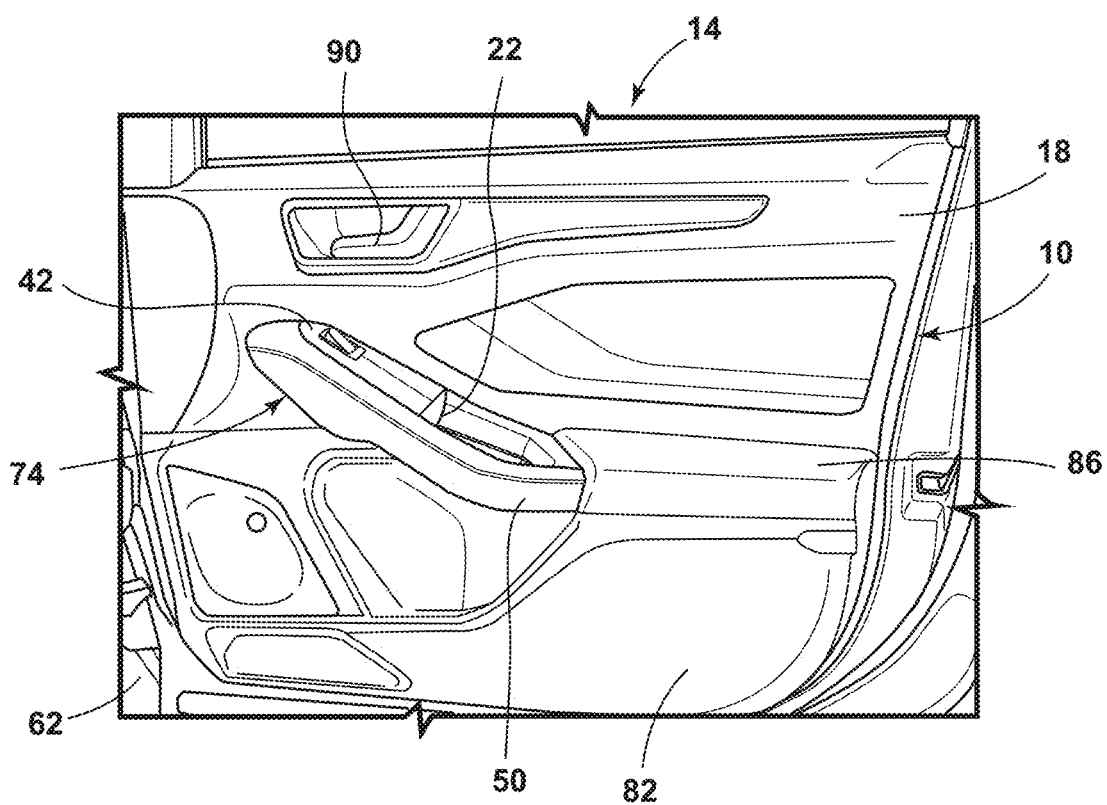
FIG. 2 is side perspective view of a door assembly with a switch bezel assembly, according to one example.
Figure 3A:
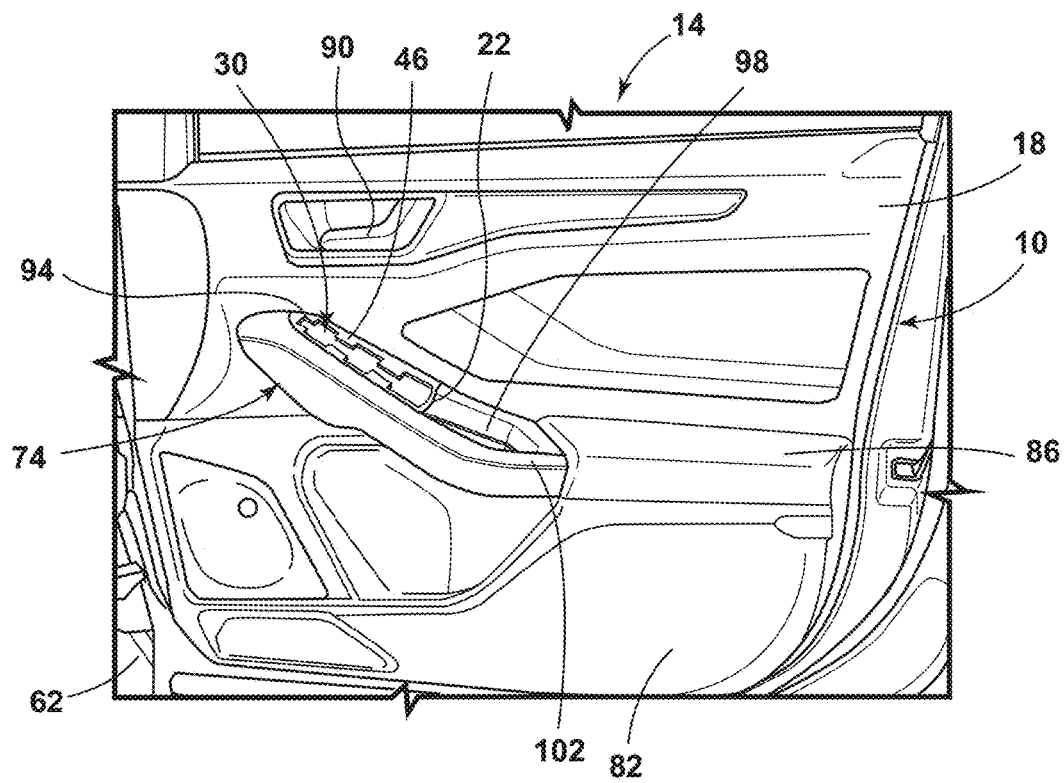
FIG. 3A is a side perspective view of a door assembly with a cover member and a switch bezel removed.
Figure 3B:
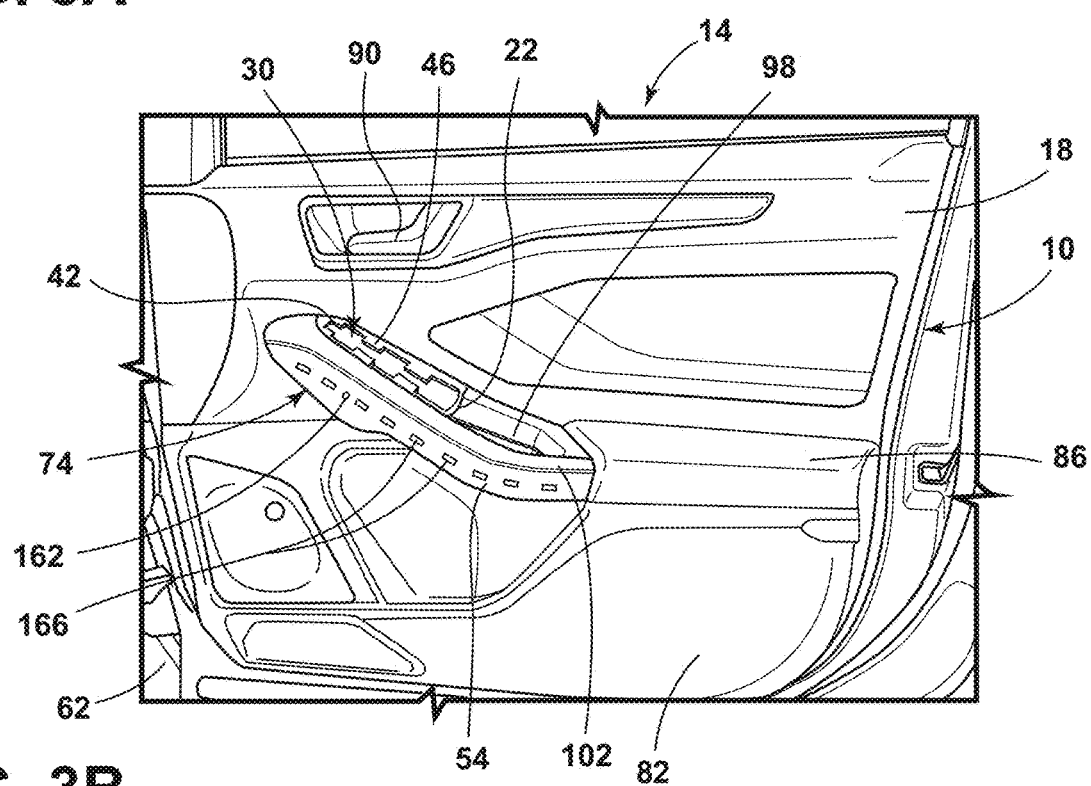
FIG. 3B is a side perspective view of a door assembly with a switch bezel removed, according to one example.

Referring to FIGS. 2, 3A, and 3B, the door assembly 10 may include a trim panel 82 and an armrest 86 both coupled to the door panel 18. The support member 22 can extend from proximate a door handle 90 to an interface between the armrest 86 and the trim panel 82 proximate a lower portion of the door assembly 10. As illustrated, the support member 22 may include a receiving portion 94 disposed proximate the door handle 90, a grasping portion 98 (e.g., an interior handle), and a connecting portion 102 disposed proximate the armrest 86. The receiving portion 94 of the support member 22 may be configured to receive and/or retain the switch bezel 42. The support member 22 may be an interior handle member, or alternatively may be a separate component adjacent to the interior handle member.

The cover member 50 may be coupled to the side portion 54 of the support member 22. The cover member 50 may extend along all, or a portion of, the support member 22. In the depicted examples of FIGS. 2 and 3B, the cover member 50 extends from proximate the handle 90 to the interface between the armrest 86 and the trim panel 82. The cover member 50 may substantially conceal the side portion 54 of the support member 22. The configuration of the door assembly 10, described herein is merely exemplary, and it is contemplated that the door assembly 10 may take any practicable configuration. For example, the receiving portion 94 of the support member 22 may be substantially horizontal, or alternatively, may be angled in a vehicle-forward or vehicle-rearward configuration. Moreover, as best illustrated in FIG. 3A, the switch bezel assembly 74 may not include the cover member 50.

Figure 4:
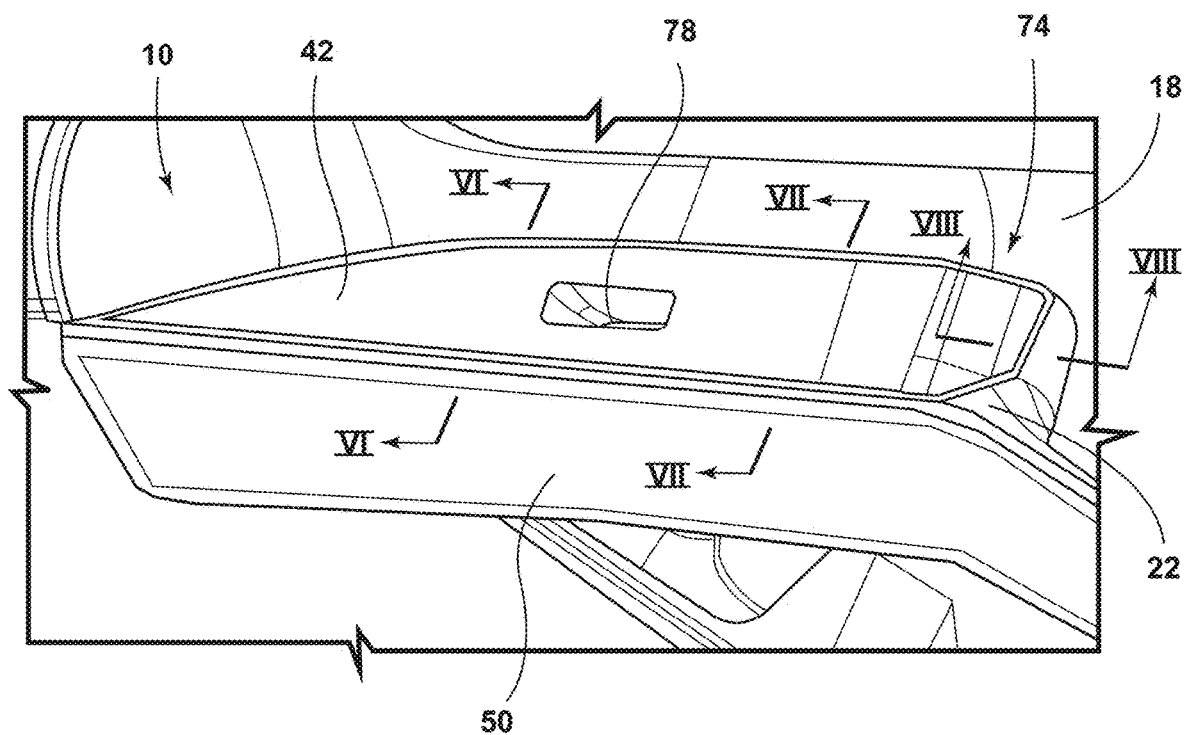
FIG. 4 is a side perspective view of a switch bezel assembly, according to one example.
Figure 5:
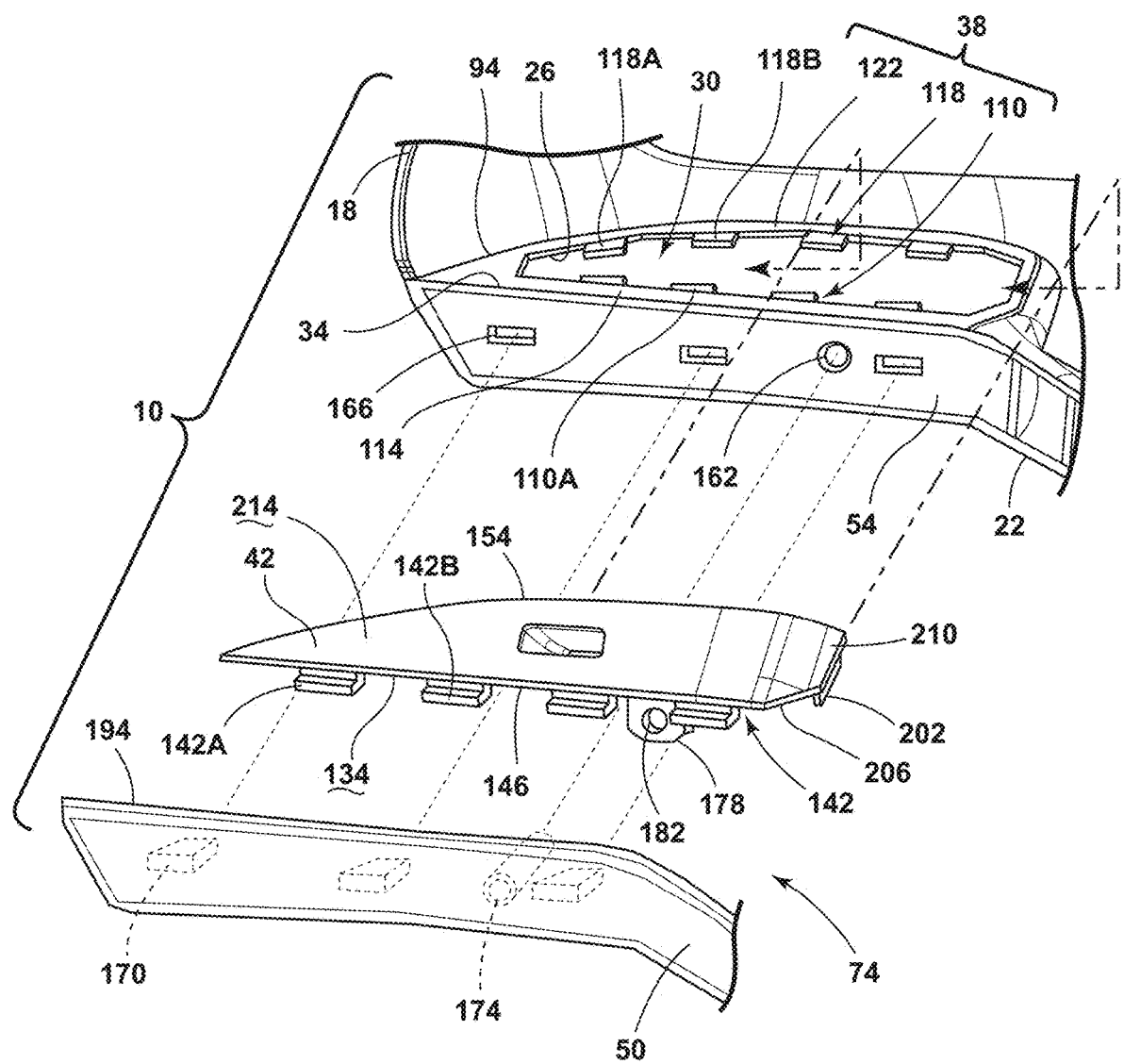
FIG. 5 is an exploded view of the switch bezel assembly of FIG. 4.

Referring to FIGS. 4 and 5, the receiving portion 94 of the support member 22 includes the edge 26 that defines the opening 30 in the top portion 34 of the support member 22. The opening 30 is generally entirely defined by the edge 26, such that the opening 30 is centrally positioned within the receiving portion 94 of the support member 22. The support member 22 includes at least one flange 38 extending into the opening 30 from the edge 26. The flange 38 may extend along a substantially same plane as the top portion 34 of the receiving portion 94 of the support member 22. The flange 38 may be integrally formed with the support member 22, such that the support member 22 is a single integrally formed component.

According to various aspects, the support member 22 may include a plurality of first flanges 110 extending from a first side 114 of the support member 22 and a plurality of second flanges 118 extending from a second side 122 of the support member 22. As illustrated in FIG. 5, the plurality of first flanges 110 and the plurality of second flanges 118 extend toward one another from opposing sides of the opening 30. Each of the plurality of first flanges 110 may align with one of the plurality of second flanges 118, such that the pluralities of first and second flanges 110, 118 are mirror images of one another. Alternatively, each of the plurality of first flanges 110 may be offset from the corresponding one of the plurality of second flanges 118. In such examples, one first flange 110A may extend toward a point between two adjacent second flanges 118A, 118B. The support member 22 may define any practicable number of first flanges 110 and second flanges 118. Moreover, the support member 22 may define a same, or alternatively a different number, of first flanges 110 as the second flanges 118.

Referring still to FIGS. 4 and 5, the switch bezel 42 may rest upon the top portion 34 of the support member 22. Depending on the configuration of the support member 22, the switch bezel 42 may be substantially horizontal, or alternatively, may be angled in a vehicle-rearward or vehicle-forward configuration. At least a portion of the switch bezel 42 may be disposed within and/or extend through the opening 30 defined by the support member 22. The switch bezel 42 is typically configured to entirely cover the opening 30 and may substantially, or entirely, cover the top portion 34 of the receiving portion 94 of the support member 22. It is contemplated that the switch bezel 42 is merely exemplary and other bezel configurations for the door assembly 10 or otherwise associated with the vehicle 14 are contemplated without departing from the teachings herein.

Referring to FIGS. 5 and 6, the support member 22 may be coupled to the door panel 18. In various examples, the door panel 18 can define one or more receiving holes 126. The support member 22 may define a corresponding number of coupling extensions 130 that each extend through one of the receiving holes 126 of the door panel 18. In non-limiting examples, the support member 22 may be fastened, adhered, welded, and/or otherwise coupled to the door panel 18.

The switch bezel 42 includes the at least one retaining feature 46. As illustrated in FIG. 6, the retaining feature 46 extends from a bottom surface 134 of the switch bezel 42. The retaining feature 46 is illustrated as a hook; however, it is contemplated that the retaining feature 46 can be any practicable feature that engages the flange 38. The switch bezel 42 may be configured to slidably engage with the support member 22. In this way, the retaining feature 46 is configured to slidably engage a lower surface 138 of the flange 38. According to various aspects, the switch bezel 42 includes a plurality of first retaining features 142 extending from the bottom surface 134 proximate a first end 146 and a plurality of second retaining features 150 extending from the bottom surface 134 proximate a second end 154. The pluralities of first and second retaining features 142, 150 are configured to align with the plurality of first and second flanges 110, 118. In this way, the switch bezel 42 typically includes the same number of and similar configurations for the pluralities of first and second retaining features 142, 150 as the pluralities of first and second flanges 110, 118 of the support member 22.

Each first and second flange 110A, 118A of the pluralities of first and second flanges 110, 118 may be configured to be received between a corresponding first and second retaining feature 142A, 150A of the pluralities of first and second retaining features 142, 150 and the bottom surface 134 of the switch bezel 42. Each of the pluralities of first and second flanges 110, 118 may include a spacer 158. As illustrated in FIG. 6, the spacers 158 extend upward from the corresponding first and second flanges 110A, 118A to abut the bottom surface 134 of the switch bezel 42. However, it is contemplated that the spacers 158 may extend downward from the plurality of first and second flanges 110A, 118A and engage the corresponding first and second retaining features 142A, 150A to retain the switch bezel 42 and minimize movement of the switch bezel 42 in the y-direction (e.g., up-and-down).

Figure 7:
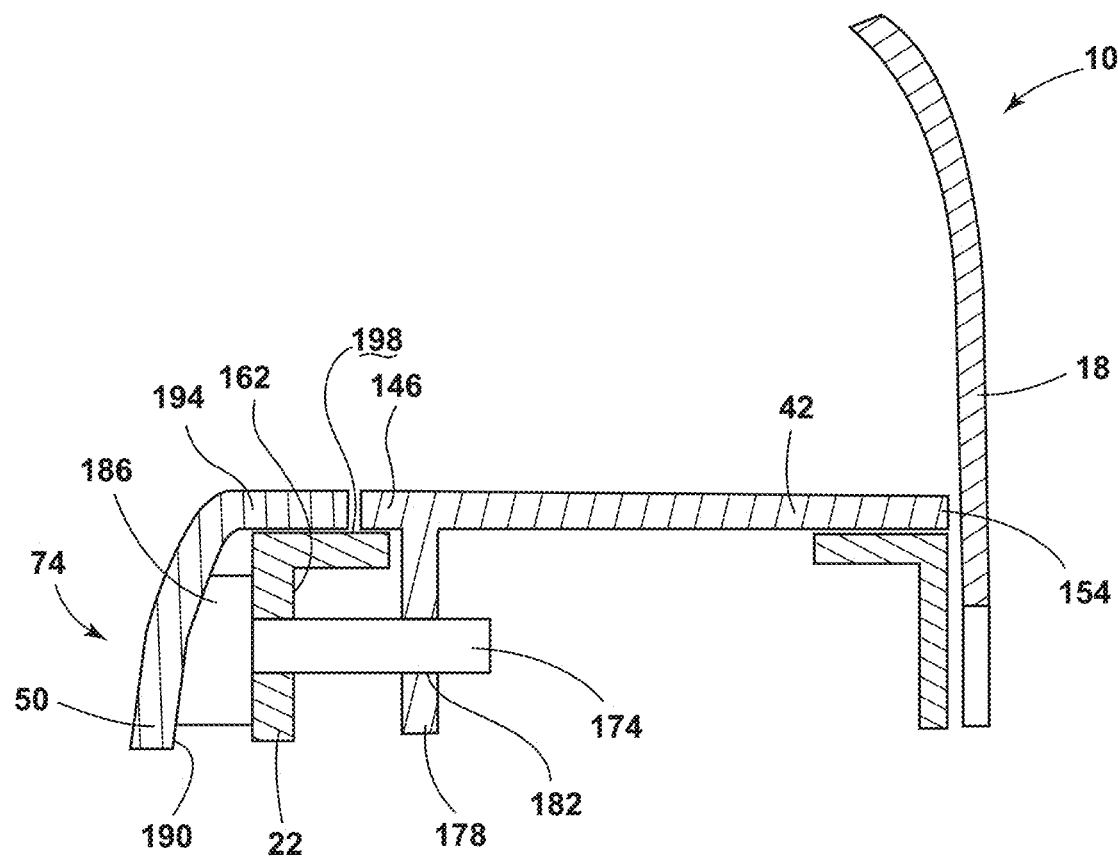
FIG. 7 is a cross-sectional view of the switch bezel assembly of FIG. 4, taken along line VII-VII.

Referring to FIGS. 4, 5, and 7, the cover member 50 may be coupled to the side portion 54 of the support member 22. The side portion 54 of the support member 22 may define a locating aperture 162 and one or more receiving slots 166. The cover member 50 includes one or more snap members 170 to extend through the receiving slots 166 to retain the cover member 50 to the support member 22. Additionally, the locating projection 174 may be configured to extend through the locating aperture 162 to assist in properly aligning the cover member 50 with the support member 22 and engaging the switch bezel 42.

The switch bezel 42 may include a locating tab 178 defining a locating hole 182. The locating tab 178 may extend from the bottom surface 134 of the switch bezel 42 in a generally vertical direction. The locating tab 178 may be positioned between two adjacent first retaining features 142A, 142B of the plurality of first retaining features 142 when the switch bezel 42 is disposed on the support member 22. When the switch bezel 42 is positioned over the opening 30, the locating tab 178 may extend into the opening 30, such that the locating hole 182 substantially aligns with the locating aperture 162 defined by the support member 22. The locating projection 174 of the cover member 50 may extend through the locating aperture 162 of the support member 22 and through the locating hole 182 of the switch bezel 42. The locating projection 174 may couple the cover member 50 with the switch bezel 42. This configuration of the cover member 50 may provide an additional engagement point to assist in reducing the movement of the switch bezel 42.

Referring still to FIGS. 5 and 7, the locating projection 174 may have any practicable configuration. For example, the locating projection 174 may have a substantially cylindrical or frustoconical shape, as best illustrated in FIG. 5. In a non-limiting example, the cover member 50 may include a base 186 coupled to an inner surface 190 of the cover member 50 with the locating projection 174 extending from the base 186, as best illustrated in FIG. 7. In this way, the base 186 may abut the support member 22 while allowing the locating projection 174 to extend through the locating aperture 162 and the locating hole 182. The base 186 may also assist in aligning the cover member 50 in the selected position relative to the support member 22.

According to various aspects, the cover member 50 may include an edge portion 194 configured to curve and rest upon an upper surface 198 of the support member 22. In this way, the edge portion 194 of the cover member 50 may be disposed adjacent to and align with the first end 146 of the switch bezel 42. The edge portion 194 and the switch bezel 42 may form a substantially continuous surface over the top portion 34 of the support member 22. It is contemplated that the switch bezel assembly 74 may not include the cover member 50. In such examples, the side portion 54 of the support member 22 may not define the locating aperture 162 and the receiving slots 166, as best illustrated in FIG. 3A.

Figure 8:
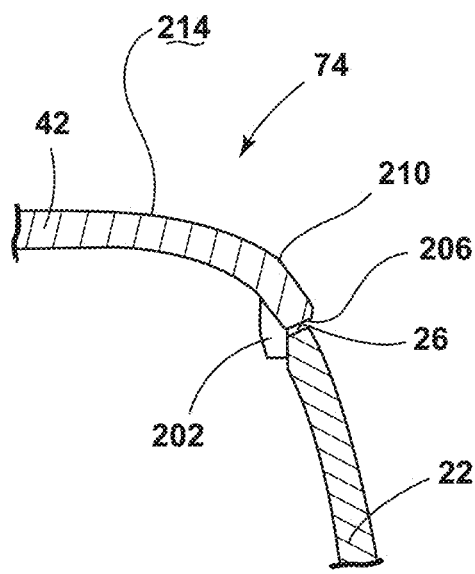
FIG. 8 is a cross-sectional view of the switch bezel assembly of FIG. 4, taken along line VIII-VIII.

Referring to FIGS. 5 and 8, the switch bezel 42 may include a rib 202 extending from the bottom surface 134 proximate a peripheral edge 206. The rib 202 may be configured to engage the edge 26 of the support member 22 or proximate thereto. The rib 202 may control and/or reduce a gap between the switch bezel 42 and the support member 22. Moreover, the rib 202 may control the positioning of the switch bezel 42 relative to the support member 22. The rib 202 may extend along a third end 210 of the switch bezel 42, which extends between the first and second ends 146, 154. The rib 202 may be configured to snap-engage with the support member 22. Once the rib 202 snap-engages with the support member 22, a top surface 214 of the switch bezel 42 may substantially align with the upper surface 198 of the support member 22 to form a substantially continuous surface. Further, the rib 202 may reduce movement of the switch bezel 42 along the x-direction (e.g., fore-and-aft in the vehicle 14).

Figure 9A:
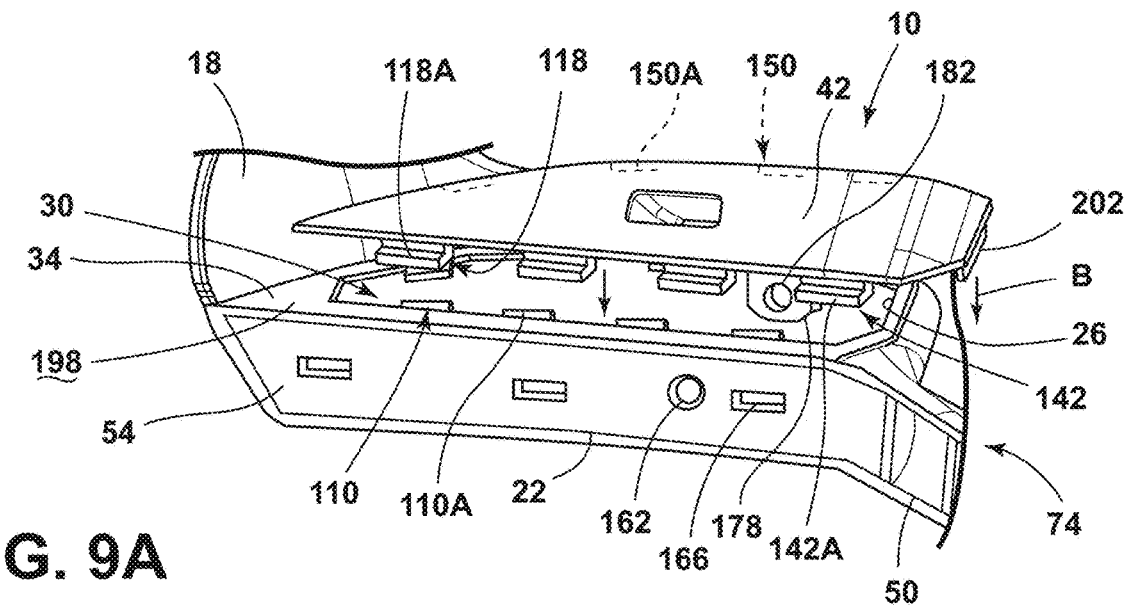
FIG. 9A is a side perspective view of a switch bezel and a support member of a switch bezel assembly in an uninstalled position with the switch bezel, according to one example.
Figure 9B:
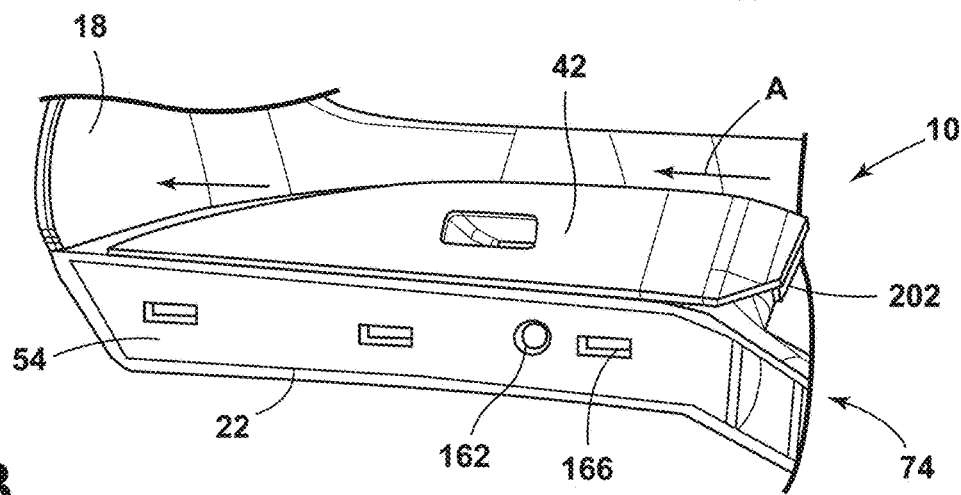
FIG. 9B is a side perspective view of the switch bezel assembly of FIG. 9A, with the switch bezel engaging the support member.
Figure 9C:
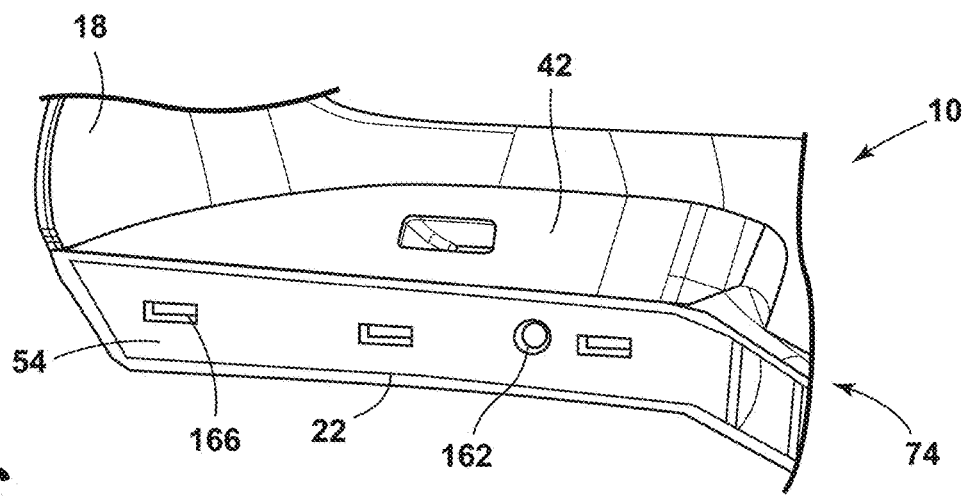
FIG. 9C is a side perspective view of the switch bezel assembly of FIG. 9A, with the switch bezel in an installed position.

Referring to FIGS. 9A-9C, the switch bezel 42 may slidably engage the support member 22. The switch bezel 42 may be disposed on the upper surface 198 of the support member 22 with the plurality of first retaining features 142 offset from the plurality of first flanges 110 and the plurality of second retaining features 150 offset from the plurality of second flanges 118. In the depicted example of FIG. 9A, each of the pluralities of first and second retaining features 142, 150 may be offset in a vehicle-rearward direction relative to the corresponding one of the pluralities of first and second flanges 110, 118 once the switch bezel 42 is resting on the support member 22. As illustrated in FIGS. 9A and 9B, the switch bezel 42 may be slid or shifted along the upper surface 198 to slidably engage the pluralities of first and second retaining features 142, 150 with the pluralities of first and second flanges 110, 118. In the depicted example, the switch bezel 42 is slid in a vehicle-forward direction A; however, it is contemplated that the position and sliding direction of the switch bezel 42 may also be in a vehicle-rearward direction or other practicable direction.

As illustrated in FIGS. 9A and 9C, once the switch bezel 42 is slidably engaged with the support member 22, the rib 202 may snap-engage with the support member 22, such that the rib 202 is disposed at least partially within the opening 30. The sliding engagement and the snap-engagement of the switch bezel 42 with the support member 22 may reduce movement of the switch bezel 42 in the z-direction (e.g., inboard-and-outboard) and the y-direction (e.g., up-and-down). In various examples, the support member 22 may not define the locating aperture 162 and the receiving slots 166, such that when the switch bezel 42 is snap-engaged with the support member 22, the assembly of the switch bezel assembly 74 may be complete.

Figure 10:
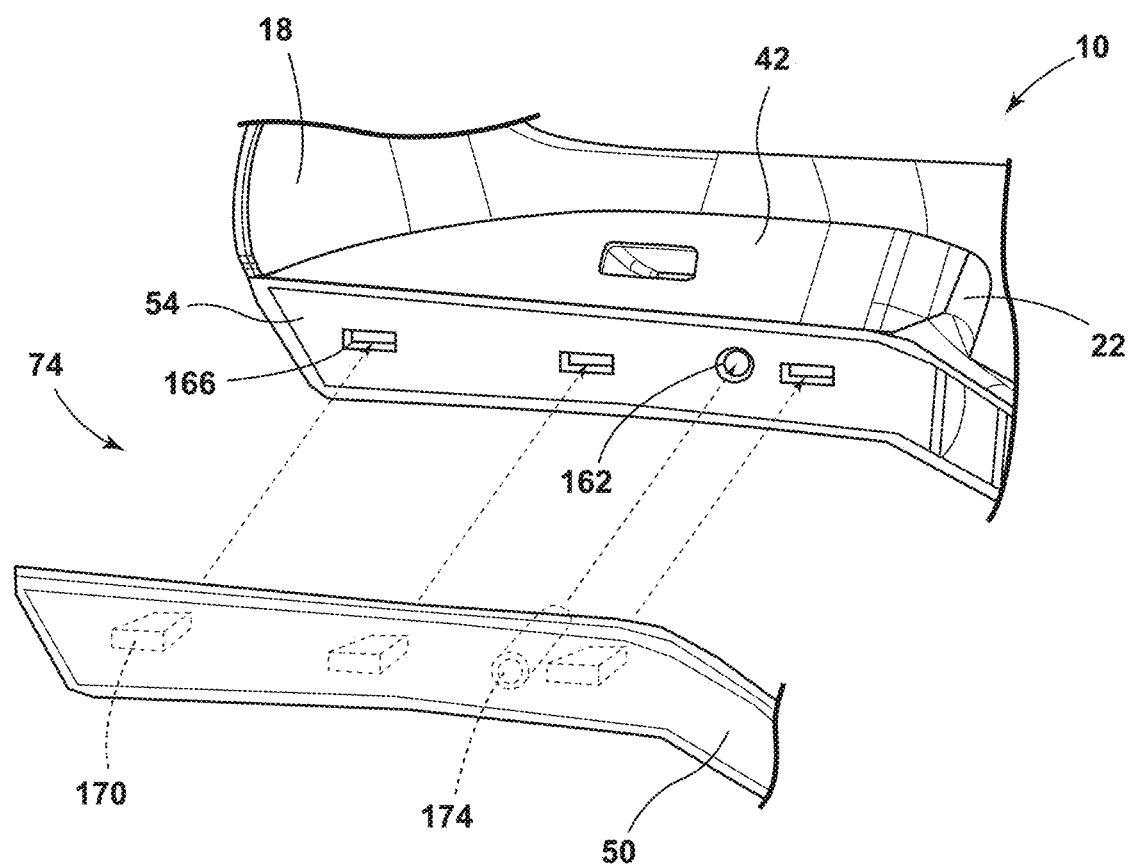
FIG. 10 is a side perspective view of a handle assembly with a cover member in an uninstalled position, according to one example.

Referring to FIG. 10, in examples where the switch bezel assembly 74 includes the cover member 50, the cover member 50 may be coupled with the support member 22. After the switch bezel 42 is snap-engaged with the support member 22, the snap members 170 of the cover member 50 may engage the support member 22 via the receiving slots 166. In various examples, the snap members 170 may be snaps, clips, clamps, or another similarly configured snap-engaging features. Further, the cover member 50 can engage the switch bezel 42 when the locating projection 174 may extend through the locating aperture 162 and the locating hole 182 (FIG. 5). The rib 202 may reduce and/or minimize movement of the switch bezel 42 in the x-direction (e.g., fore-and-aft). As such, when the switch bezel assembly 74 is fully assembled, the switch bezel 42 may have restricted movement in the x-, y-, and z-directions.

Referring to FIGS. 9A-10, the cover member 50 may be disengaged from the support member 22 for servicing or repair. The rib 202 can be disengaged from the support member 22. In a non-limiting example, the rib 202 can be lifted using a tool placed between the switch bezel 42 and the support member 22. The switch bezel 42 may then be shifted in a direction opposite the direction A illustrated in FIG. 9B, to the pluralities of first and second retaining features 142, 150 from the corresponding of the pluralities of first and second flanges 110, 118. The switch bezel 42 may then be removed from the support member 22 in a direction opposite of the direction B illustrated in FIG. 9A. The configuration of the retaining feature 46 may provide for greater durability during assembling and reassembling the switch bezel assembly 74.

Referring to FIG. 11, and with further reference to FIGS. 1-10, a method 300 of manufacturing the switch bezel assembly 74 includes step 304 of providing the support member 22 having the flange 38 extending into the opening 30. Step 304 may also include coupling the support member 22 to the door panel 18. In step 308, the switch bezel 42 is positioned proximate the receiving portion 94 of the support member 22 adjacent to the opening 30. The retaining feature 46 may be disposed proximate the flange 38. In step 312, the switch bezel 42 may slidably engage with the support member 22. The retaining feature 46 may slide under the flange 38 to engage the lower surface 138 of the flange 38.

In step 316, the switch bezel 42 may snap-engage with the support member 22. The rib 202 may snap-engage with the edge 26 of the support member 22. Step 316 may include sliding the switch bezel 42 until the rib 202 snap-engages with the support member 22. In step 320, the cover member 50 may be coupled to the support member 22. In this way, the snap members 170 may extend through the receiving slots 166 and the locating projection 174 may extend to the locating aperture 162. Step 320 may also include coupling the cover member 50 to the switch bezel 42 via the locating projection 174 extending through the locating hole 182 of the locating tab 178. Additionally or alternatively, step 320 may include coupling the cover member 50 to the door panel 18. The door panel 18 may define one or more receiving holes 126 for receiving additional snap members 170 of the cover member 50. In this way, the cover member 50 may be retained to the support member 22 and the door panel 18.

Each of the support member 22, the switch bezel 42, and the cover member 50 may be unitary, integrally formed components. In this way, each of the switch bezel 42, the support member 22, and the cover member 50 may be formed through a molding process, such as, for example, an injection molding process. As such, the flange 38 may be integrally formed with the support member 22. Additionally, the retaining feature 46 and the rib 202 may be integrally formed with the switch bezel 42. Further, the snap members 170 and the locating projection 174 may be integrally formed with the cover member 50. This manufacturing process may reduce manufacturing and production costs by reducing the number of components included in the switch bezel assembly 74.

Use of the present device may provide for a variety of advantages. For example, the support member 22, the switch bezel 42, and the cover member 50 may be formed through an injection molding process, which can reduce the number of components included in the switch bezel assembly 74. Additionally, the integrally formed retaining feature 46 of the switch bezel 42 may have increased durability during assembly and reassembly of the switch bezel assembly 74. Further, the sliding engagement of the switch bezel 42 with the support member 22 may utilize less space during the assembly process. The reduced space of the switch bezel assembly 74 may increase flexibility in design of the switch bezel assembly 74. Additionally, the switch bezel 42 may be a component of the door assembly 10 installed during manufacturing, or may be installed at a later time. Additionally, the sliding engagement may reduce a possibility of vertical separation of the switch bezel 42 from the support member 22. Moreover, engagement between the flange 38 and the retaining feature 46 may limit movement of the switch bezel 42 in the y- and z-directions. Also, the engagement between the rib 202 of the switch bezel 42 with the support member 22 may reduce movement of the switch bezel 42 in the x-direction. The configuration of the switch bezel assembly 74 may reduce the possibility of the switch bezel 42 separating from the support member 22. Additional benefits or advantages of using this device may also be realized and/or achieved.

According to various examples, a vehicle door assembly including a door panel. A support member is coupled to the door panel. The support member has an edge defining an opening in a top portion thereof. The support member defines at least one flange extending into the opening from the edge. A switch bezel is disposed at least partially within the opening. The switch bezel includes at least one retaining feature configured to slidably engage the at least one flange. A cover member coupled to a side portion of the support member. Embodiments of the present disclosure may include one or a combination of the following features:

- a switch bezel defines a rib extending from a bottom surface thereof adjacent to a peripheral edge and configured to snap-engage with a support member;
- a support member defines a receiving slot and a locating aperture in a side portion thereof;
- a cover member includes integrally formed snap members received by a receiving slot;
- a cover member defines a locating projection received by a locating aperture;
- a cover member includes an edge portion disposed on an upper surface of a support member adjacent to a switch bezel;
- an at least one flange includes a plurality of first flanges extending from a first side and a plurality of second flanges extending from a second side;
- an at least one retaining feature includes a plurality of first retaining features that slidably engage with a plurality of first flanges and a plurality of second retaining features that slidably engage with a plurality of second flanges; and
- each of a plurality of first retaining features engage a lower surface of one of a plurality of first flanges.

According to various examples, a method of manufacturing a switch bezel assembly including a support member that provides having at least one flange extending into an opening defined in a top portion thereof. A switch bezel having at least one retaining feature positioned proximate the opening. The at least one retaining feature sliding under the at least one flange. The switch bezel snap-engaging with an edge of the support member. Embodiments of the present disclosure may include one or a combination of the following features:

- a cover member coupled to a side portion of a support member and a locating tab of the switch bezel.

According to various examples, a switch bezel assembly including a support member having an edge that defines an opening in a top portion thereof. The support member defines at least one flange extending into the opening. A switch bezel having at least one retaining feature that slidably engages the at least one flange. The switch bezel includes a rib configured to engage the edge of the support member. Embodiments of the present disclosure may include one or a combination of the following features:

- a support member having an edge defining an opening in a top portion thereof. The support member defines at least one flange extending into the opening. A switch bezel having at least one retaining feature that slidably engages the at least one flange. The switch bezel includes a rib configured to engage the edge of the support member;
- a switch bezel includes a locating tab defining a locating hole. A locating tab extends from a bottom surface thereof
- a support member defines a locating aperture in the side portion thereof. A locating hole aligns with the locating aperture;
- a cover member coupled to the side portion of the support member. The cover member includes a locating projection that extends through a locating aperture and a locating hole;
- a cover member includes a snap member that extends through a receiving slot defined in a side portion of a support member;
- at least one flange includes a plurality of flanges and at least one retaining feature includes a plurality of retaining features. Each of the plurality of retaining features slidably engages a lower surface of one of the plurality of flanges;
- a rib extends from a bottom surface proximate a peripheral edge thereof;
- a rib snap-engages with an edge of a support member; and
- a cover member coupled to a side portion of a support member. The cover member includes an edge portion disposed on an upper surface of the support member and aligned with a switch bezel.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle door assembly, comprising:
   a door panel;
   a support member coupled to the door panel, wherein the support member has an edge defining an opening in a top portion thereof, and wherein the support member defines at least one flange extending into the opening from the edge;
   a switch bezel disposed at least partially within the opening, wherein the switch bezel includes at least one retaining feature configured to slidably engage the at least one flange, and wherein the switch bezel includes a locating tab defining a locating hole that aligns with a locating aperture of the support member; and
   a cover member coupled to a side portion of the support member, wherein the cover member includes a locating projection that extends through the locating aperture and the locating hole.

2. The vehicle door assembly of claim 1, wherein the switch bezel defines a rib extending from a bottom surface thereof adjacent to a peripheral edge and configured to snap-engage with the support member.

3. The vehicle door assembly of claim 1, wherein the support member defines a receiving slot and the locating aperture in the side portion thereof.

4. The vehicle door assembly of claim 3, wherein the cover member includes integrally formed snap members received by the receiving slot.

5. The vehicle door assembly of claim 1, wherein the cover member includes an edge portion disposed on an upper surface of the support member adjacent to the switch bezel.

6. The vehicle door assembly of claim 1, wherein the at least one flange includes a plurality of first flanges extending from a first side and a plurality of second flanges extending from a second side.

7. The vehicle door assembly of claim 6, wherein the at least one retaining feature includes a plurality of first retaining features that slidably engage with the plurality of first flanges and a plurality of second retaining features that slidably engage with the plurality of second flanges.

8. The vehicle door assembly of claim 7, wherein each of the plurality of first retaining features engages a lower surface of one of the plurality of first flanges.

9. A method of manufacturing a switch bezel assembly, comprising:
   providing a support member having at least one flange extending into an opening defined in a top portion thereof;
   positioning a switch bezel having at least one retaining feature proximate the opening;
   sliding the at least one retaining feature under the at least one flange;
   snap-engaging the switch bezel with an edge of the support member; and
   coupling a cover member to a side portion of the support member and a locating tab of the switch bezel.

10. A switch bezel assembly, comprising:
    a support member having an edge defining an opening in a top portion thereof, wherein the support member defines at least one flange extending into the opening, and wherein the support member defines a locating aperture in a side portion thereof; and
    a switch bezel having at least one retaining feature that slidably engages the at least one flange, wherein the switch bezel includes a rib configured to engage the edge of the support member, wherein the switch bezel includes a locating tab defining a locating hole, and wherein the locating tab extends from a bottom surface thereof, and wherein the locating hole aligns with the locating aperture.

11. The switch bezel assembly of claim 10, further comprising:
    a cover member coupled to the side portion of the support member, wherein the cover member includes a locating projection that extends through the locating aperture and the locating hole.

12. The switch bezel assembly of claim 11, wherein the cover member includes a snap member that extends through a receiving slot defined in the side portion of the support member.

13. The switch bezel assembly of claim 10, wherein the at least one flange includes a plurality of flanges and the at least one retaining feature includes a plurality of retaining features, and wherein each of the plurality of retaining features slidably engages a lower surface of one of the plurality of flanges.

14. The switch bezel assembly of claim 10, wherein the rib extends from a bottom surface proximate a peripheral edge thereof.

15. The switch bezel assembly of claim 10, wherein the rib snap-engages with the edge of the support member.

16. The switch bezel assembly of claim 10, further comprising:
    a cover member coupled to a side portion of the support member, wherein the cover member includes an edge portion disposed on an upper surface of the support member and aligned with the switch bezel.

\* \* \* \* \*